2,965,634
NORLEUCINE DERIVATIVES AND PROCESS FOR PRODUCING SAME

Alexander M. Moore, Grosse Pointe Farms, and Horace A. De Wald, Grosse Pointe Woods, Mich., assignors to Parke, Davis & Company, Detroit, Mich., a corporation of Michigan No Drawing. Filed Jan. 15, 1958, Ser. No. 708,967

9 Claims. (Cl. 260—239)

This application is a continuation-in-part of our copending applications Serial Number 530,486, filed August 25, 1955, now abandoned, and Serial Number 570,418, filed March 9, 1956, and the invention relates to a process for producing 6-diazo-5-oxonorleucines and to certain intermediate norleucine derivatives produced in said process. In accordance with the invention 6-diazo-5-oxonorleucines which have the formula $$N_2CH-\overset{O}{\overset{\|}{C}}-CH_2CH_2\underset{\underset{NH_2}{|}}{CH}-COOH$$

are produced by reacting a lower alkyl ester or alkali metal or alkaline earth metal salt of 6-diazo-5-oxo-N-phthaloylnorleucine with hydrazine to obtain the corresponding 6-diazo-5-oxonorleucine ester or metal salt of formula

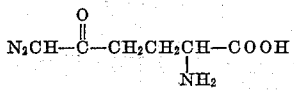

where R is an alkali metal, alkaline earth metal or lower alkyl radical, in the case where R is an alkyl radical hydrolyzing the ester group under alkaline conditions to obtain a metal salt of 6-diazo-5-oxonorleucine, and converting the metal salt of the 6-diazo-5-oxonorleucine to the free acid, 6-diazo-5-oxonorleucine, by treatment with an acid. These transformations can be illustrated as follows:

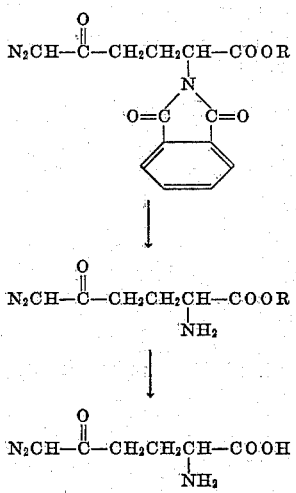

where R has the same significance as given above.

From the formulas given above it will be seen that the 6-diazo-5-oxonorleucine exists in the optically active D and L forms as well as the optical racemic DL form and that the same is true of the intermediate products and starting products used in the preparation of these substances. It is to be understood that the formulas throughout the specification and claims, in the absence of a designation to the contrary, represent the D-optical isomer, the L-optical isomer or the DL-optically inactive form of the chemical compounds. The same convention, in the absence of a designation to the contrary, is to be applied to the chemical names appearing in the specification and claims. Thus, where a chemical name does not specify which optical form is intended, the name is to be interpreted in its generic sense, that is, as meaning either the D-optical isomer, the L-optical isomer or the optically racemic DL-form.

The hydrazineolysis step of the process is preferably carried out using two equivalents of hydrazine. A slight excess i.e. less than three equivalents, of hydrazine may be employed; greater amounts tend to cause formation of the corresponding hydrazide thereby lowering the yield of the desired 6-diazo-5-oxonorleucine intermediate. The hydrazine can be supplied to the reaction mixture in various forms. For example, aqueous solutions of hydrazine or hydrazine hydrate can be used in the process. The reaction in the case where the intermediate product is a metal salt is carried out under aqueous conditions and, where the product is an ester, in an organic solvent such as a lower aliphatic alcohol, chlorinated hydrocarbon, cyclic ether and the like. Specific examples of solvents which can be employed are methanol, ethanol, chloroform, methylene chloride, dioxane, etc. The reaction can be conveniently carried out at temperatures below about 50° C. and preferably at room temperature or below.

The hydrolysis of the ester of 6-diazo-5-oxonorleucine is carried out in an aqueous medium under alkaline conditions below room temperature, preferably in the presence of a water-miscible organic solvent. As alkaline agents, alkali metal or alkaline earth metal hydroxides, carbonates, bicarbonates, oxides, alkoxides, amides and the like, can be employed. Preferably, a dilute solution, containing from 1.0 to 1.1 equivalents, of an alkali metal hydroxide such as sodium hydroxide or potassium hydroxide is employed at a temperature in the range from −10 to 5° C. Hydrolysis is ordinarily complete within one hour at 0° C. and within one to two hours at 4° C.

The neutralization of the alkali metal or alkaline earth metal salt of 6-diazo-5-oxonorleucine is carried out with acid below room temperature, preferably between −10 to 5° C. For this purpose, a mineral acid such as hydrochloric acid, hydrobromic acid, sulfuric acid, phosphoric acid and the like, is preferred. Neutralization is accomplished by carefully lowering the pH into the range of 5.5 to 7, the range of 6 to 6.5 being preferred. The product can be isolated conveniently by evaporation in vacuo, lyophilization, chromatography, etc.

The 6-diazo-5-oxonorleucines produced by the process of the invention possess phytotoxic and other interesting properties. They are particularly useful as herbicides, deweeding agents and the like. For this purpose, a dilute aqueous solution is employed and the solution applied to the plant or plant crop in accordance with methods which are known in the art. The compounds are effective in high dilution and in addition have a selective action against certain undesirable weed species. For example, in the case of L-diazo-5-oxonorleucine, an aqueous solution at a concentration of 1,000 parts per million applied in a spray to the point of drip off to separate vigorously growing test plots of lambsquarter and pigweed gives 100% kills whereas the growth of a comparable plot of corn is inhibited to the extent of only 20% under identical conditions. The 6-diazo-5-oxonorleucine esters and metal salts with which the invention is concerned are useful as intermediates for the production of the 6-diazo-5-oxonorleucines. The method by which these compounds can be converted to the 6-diazo-5-oxonorleucines has been described above.

The invention is illustrated by the following examples:

Example 1

4.3 grams of L-6-diazo-5-oxo-N-phthaloylnorleucine, methyl ester, is dissolved in 70 ml. of methylene dichloride; 1.35 g. of hydrazine hydrate is added and the mixture is stirred for about two hours and allowed to stand at 20–25° C. for sixteen hours. The reaction mixture is then stored at 0° C. for four hours and filtered. The filter cake contains the hydrazine salt of phthaloyl hydrazine. The filtrate is evaporated in vacuo. The residual product is L-6-diazo-5-oxonorleucine, methyl ester, which has the formula

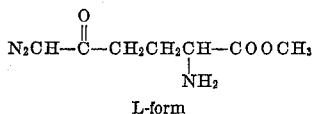

L-form 2.2 grams of L-6-diazo-5-oxonorleucine, methyl ester, is dissolved in 60 ml. of methanol and cooled to 0° C., 15 ml. of one normal sodium hydroxide is added and the solution stored at 0° C. for sixteen hours. The cold solution containing the sodium salt of L-6-diazo-5-oxonorleucine is adjusted to pH 6.5 by the addition of 2 normal hydrochloric acid with rapid stirring. The yellow solution is evaporated in vacuo to remove the methanol. The residual product is dissolved in about 50 ml. of water, the solution is frozen and the ice sublimed from the frozen mass under high vacuum. 250 milligrams of the solid residue is dissolved in 10 ml. of water containing 1% acetone and the solution is poured into an adsorption column containing 15 g. of activated carbon and 15 g. of diatomaceous earth. The column is immediately washed and developed with approximately 2.5 hold-up volumes of 1% aqueous acetone and the eluate is collected in 10 ml. fractions. The three fractions showing the strongest ultraviolet absorption at a wave-length of 275 millimicrons are frozen and the ice sublimed from the frozen mass under high vacuum to obtain the desired L-6-diazo-5-oxonorleucine which has the formula,

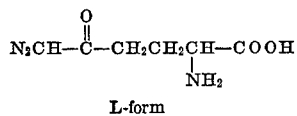

L-form

The product can be purified by recrystallization from solution in several drops of water by addition of five volumes of absolute ethanol; $[\alpha]_D^{26} = +21$ (5.4% in water);

$E_{1\,cm.}^{1\%} = 683$ at λ 274 millimicrons and $E_{1\,cm.}^{1\%} = 376$ at λ 244 millimicrons in phosphate buffer at pH 7.

The opposite optical isomer, D-6-diazo-5-oxonorleucine, can be prepared by the same method set forth above starting from D-6-diazo-5-oxo-N-phthaloylnorleucine ester. This substance is first converted to D-6-diazo-5-oxonorleucine methyl ester which is then hydrolyzed with sodium hydroxide to produce the sodium salt of D-6-diazo-5-oxonorleucine and the latter product treated with acid.

Example 2

A solution of 24 g. of DL-6-diazo-5-oxo-N-phthaloylnorleucine, methyl ester, in 170 ml. of methylene chloride is treated with 7.7 g. of hydrazine hydrate and the cloudy solution is stirred at 22–25° C. for fifteen hours and is then filtered. The filtrate is evaporated in vacuo. The residual product, DL-6-diazo-5-oxonorleucine, methyl ester, has the formula

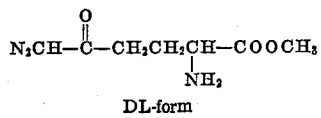

DL-form 12.5 grams of DL-6-diazo-5-oxonorleucine, methyl ester, is dissolved in 300 ml. of methanol and cooled to 0° C. 70 milliliters of 1 normal sodium hydroxide is added and the pale red solution is stored at 0° C. for sixteen hours. The pH of the solution containing the sodium salt of DL-6-diazo-5-oxonorleucine is adjusted to 6.5 with 2 normal hydrochloric acid, and the mixture is evaporated in vacuo to remove the methanol. The residue is frozen and the ice sublimed from the frozen mass under high vacuum. The solid residue is dissolved in 1% aqueous acetone and adsorbed on a column containing 45 g. of activated carbon and 45 g. of diatomaceous earth. The column is washed and developed with approximately 2.5 mold-up volumes of 1% aqueous acetone and the eluate is collected in 10 ml. fractions. The fractions showing the strongest ultraviolet absorption at 275 millimicrons are frozen and the ice is sublimed from the frozen mass to obtain the desired DL-6-diazo-5-oxonorleucine. This product, which has the formula

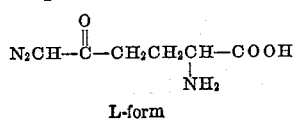

L-form is recrystallized from aqueous alcohol to obtain material having an ultraviolet absorption, $E_{1\,cm.}^{1\%}$ of 683 at a wavelength of 274 millimicrons in aqueous phosphate buffer at pH 7.

Example 3

0.90 gram of hydrazine hydrate is added to a suspension of 3.1 g. of L-6-diazo-5-oxo-N-phthaloylnorleucine potassium salt in 60 ml. of methanol and the mixture is stirred for about two hours and allowed to stand at 20–25° C. for sixteen hours. The reaction mixture is concentrated by evaporation in vacuo. The residue is dissolved in 50 ml. of water and the pH adjusted to 6.5 with one normal hydrochloric acid. The solution is filtered and the filtrate poured into an absorption column containing 20 g. of activated carbon and 20 g. of diatomaceous earth. The column is immediately washed and developed with about 2.5 hold-up volumes of 1% aqueous acetone, and the eluate is collected in 10-ml. fractions. The four fractions showing the strongest ultraviolet absorption at 275 millimicrons are frozen and the ice sublined from the frozen mass under high vacuum to obtain the desired L-6-diazo-5-oxonorleucine; $[\alpha]_D^{26} = +21°$ (5.4% in water);

$E_{1\,cm.}^{1\%} = 683$ at 274 millimicrons and 376 at 244 millimicrons. The opposite optical isomer, D-6-diazo-5-oxonorleucine, can be prepared by the same method starting from D-6-diazo-5-oxo-N-phthaloylnorleucine potassium salt which in turn can be prepared from the corresponding alkyl ester by the method set forth immediately below.

The starting material used in the above example can be prepared in the following manner: 4.5 grams of L-6-diazo-5-oxo-N-phthaloylnorleucine, methyl ester, is dissolved in 50 ml. of 70% methanol; 2.5 g. of potassium carbonate is added and the solution is allowed to stand at 10° for twenty-four hours. The solution is evaporated in vacuo. The residual product is the potassium salt of L-6-diazo-5-oxo-N-phthaloylnorleucine, which can be used directly as a starting material for the above procedure without further processing. Other metal salts can be prepared in like manner.

The 6-diazo-5-oxo-N-phthaloylnorleucine esters used as starting materials can be prepared by the method described in J. Am. Chem. Soc., 72, 2469 (1950), for the preparation of the methyl ester of 6-diazo-5-oxo-N-phthaloylnorleucine.

We claim:
1. A compound of formula

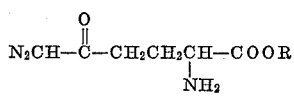

where R is a member of the group consisting of alkali metal, alkaline earth metal and lower alkyl radicals.
2. A lower alkyl ester of a 6-diazo-5-oxonorleucine.
3. D-6-diazo-5-oxonorleucine, methyl ester.
4. L-6-diazo-5-oxonorleucine, methyl ester.
5. DL-6-diazo-5-oxonorleucine, methyl ester.
6. Process for the production of 6-diazo-5-oxonorleucine which comprises reacting a compound having the formula,

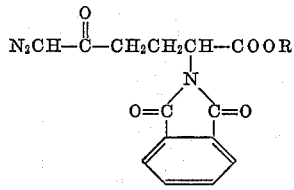

with hydrazine to obtain a compound having the formula,

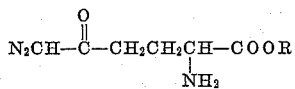

hydrolyzing any ester group present in an aqueous alkaline medium below room temperature, and neutralizing the metal salt of 6-diazo-5-oxonorleucine with an acid; where R is a member of the group consisting of alkali metal, alkaline earth metal and lower alkyl radicals.
7. Process according to claim 9 wherein at least two equivalents and less than three equivalents of hydrazine are employed at a temperature below 50° C.
8. Process according to claim 6 wherein neutralization is accomplished by adjusting the pH to 5.5 to 7.
9. In a process for production of 6-diazo-5-oxonorleucine, the step which comprises reacting a compound having the formula

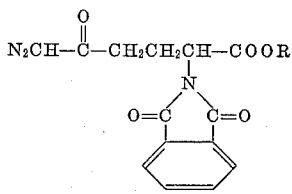

with hydrazine to obtain a compound having the formula,

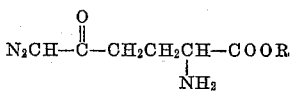

where R is a member of the group consisting of alkali metal, alkaline earth metal and lower alkyl radicals.

References Cited in the file of this patent

FOREIGN PATENTS 550,604      Belgium _____ Dec. 16, 1956
2529/56     Union of South Africa ____ Aug. 3, 1956

OTHER REFERENCES

Chemical and Eng. News, Apr. 30, 1956 (page 2119).
Anson: Adv. in Prot. Chemistry, vol. 12 (1957), pp. 472, 474–475; vol. 5, p. 32 (1949).
Sheehan: J. Am. Chem. Soc., vol. 72, p. 2469 (1950).
Anson: Advances in Protein Chemistry, vol. 12, p. 471 (1957), Academic Press Inc. Publishers, New York.